(No Model.) 5 Sheets—Sheet 1.
H. W. CLARK.
LUMBER STACKER.
No. 457,611. Patented Aug. 11, 1891.
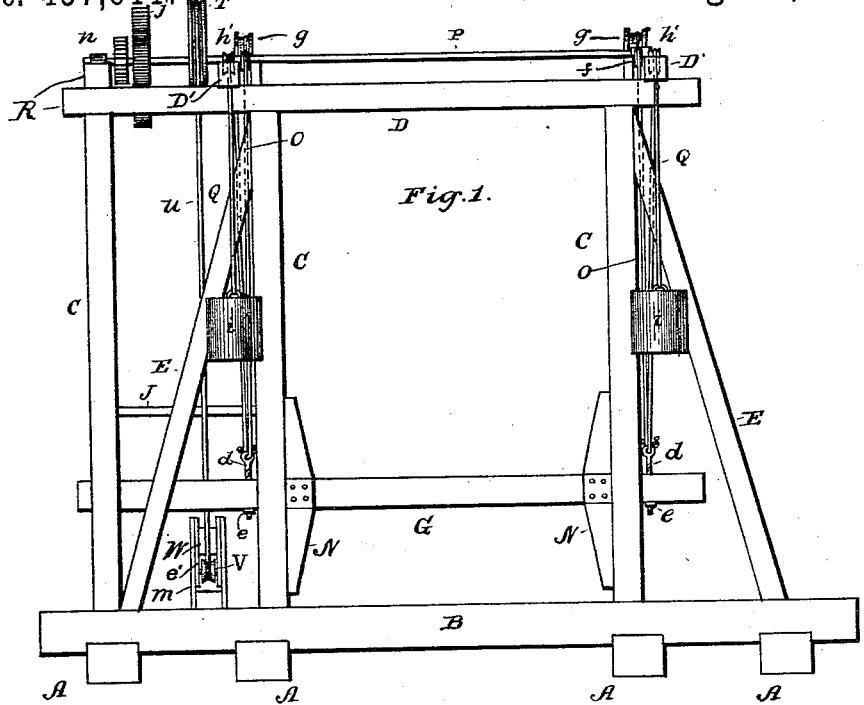
Fig. 1.
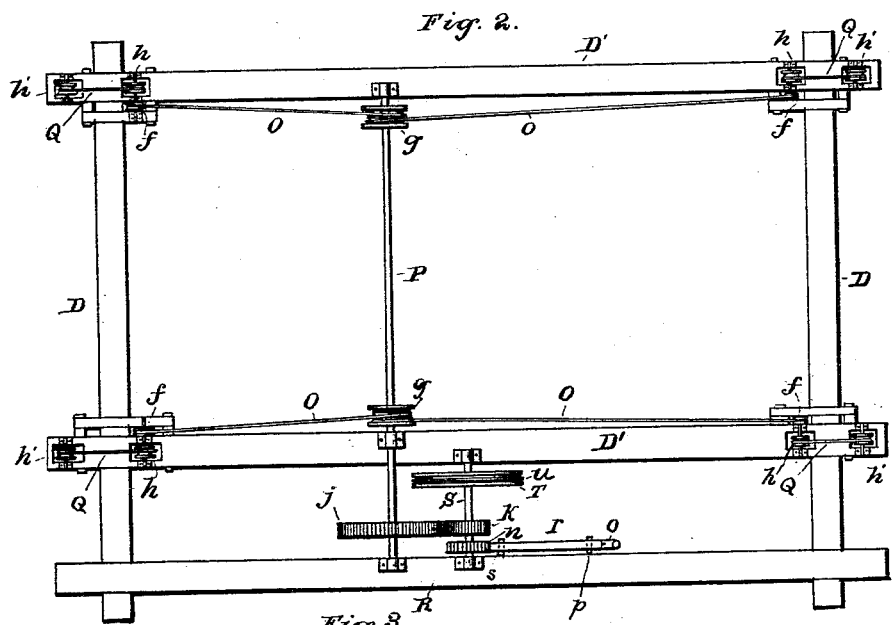
Fig. 2.
Fig. 3.
Attest.
Victor J. Evans.
A. L. Evans
Inventor.
Henry W. Clark
By W. A. Redmond
Atty (No Model.) 5 Sheets—Sheet 2.
H. W. CLARK.
LUMBER STACKER.
No. 457,611. Patented Aug. 11, 1891.
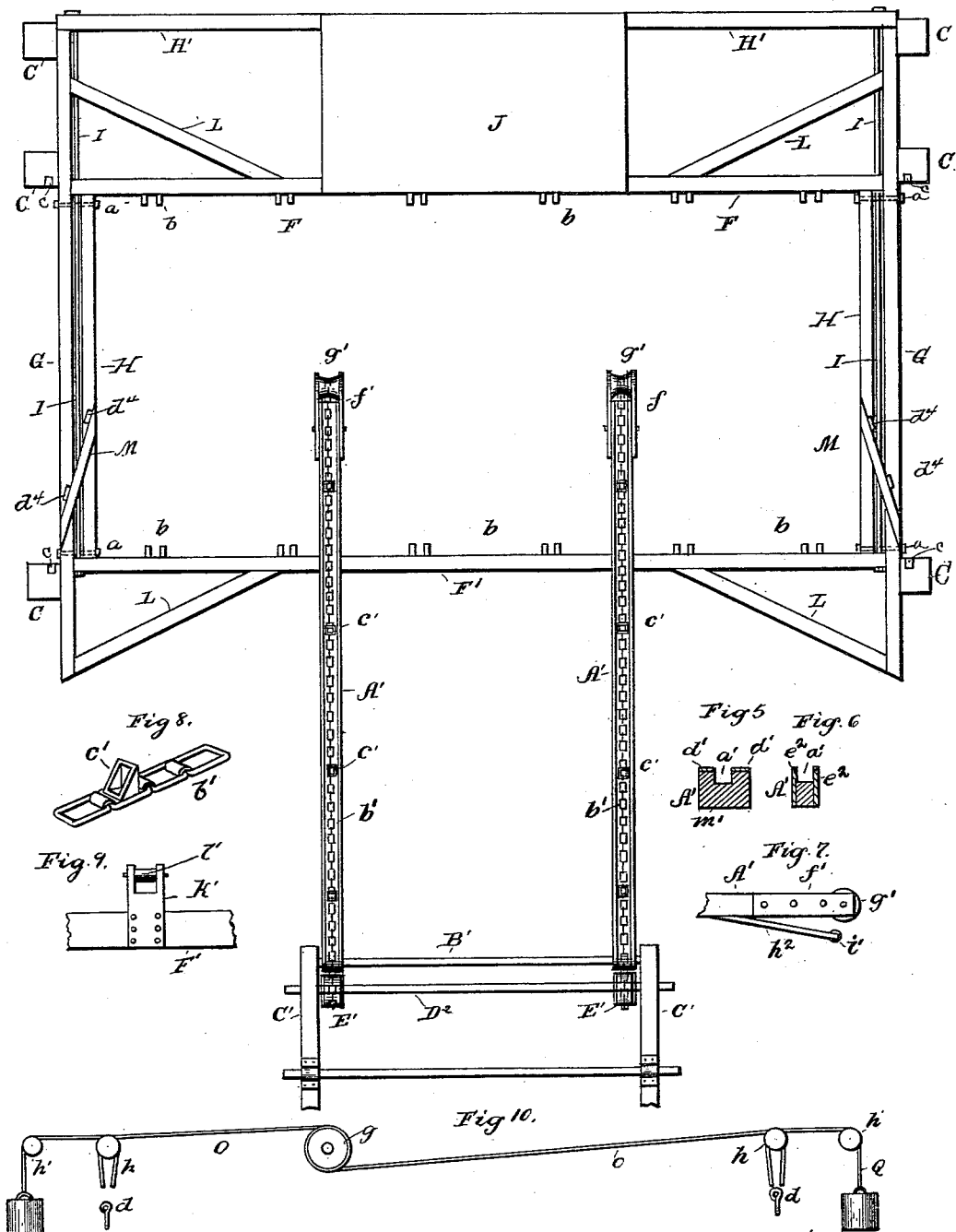
Attest.
Victor J. Evans.
A. L. Evans
Inventor.
Henry W. Clark
By W. A. Redmond, Atty.

(No Model.) 5 Sheets—Sheet 3.
H. W. CLARK.
LUMBER STACKER.
No. 457,611. Patented Aug. 11, 1891.
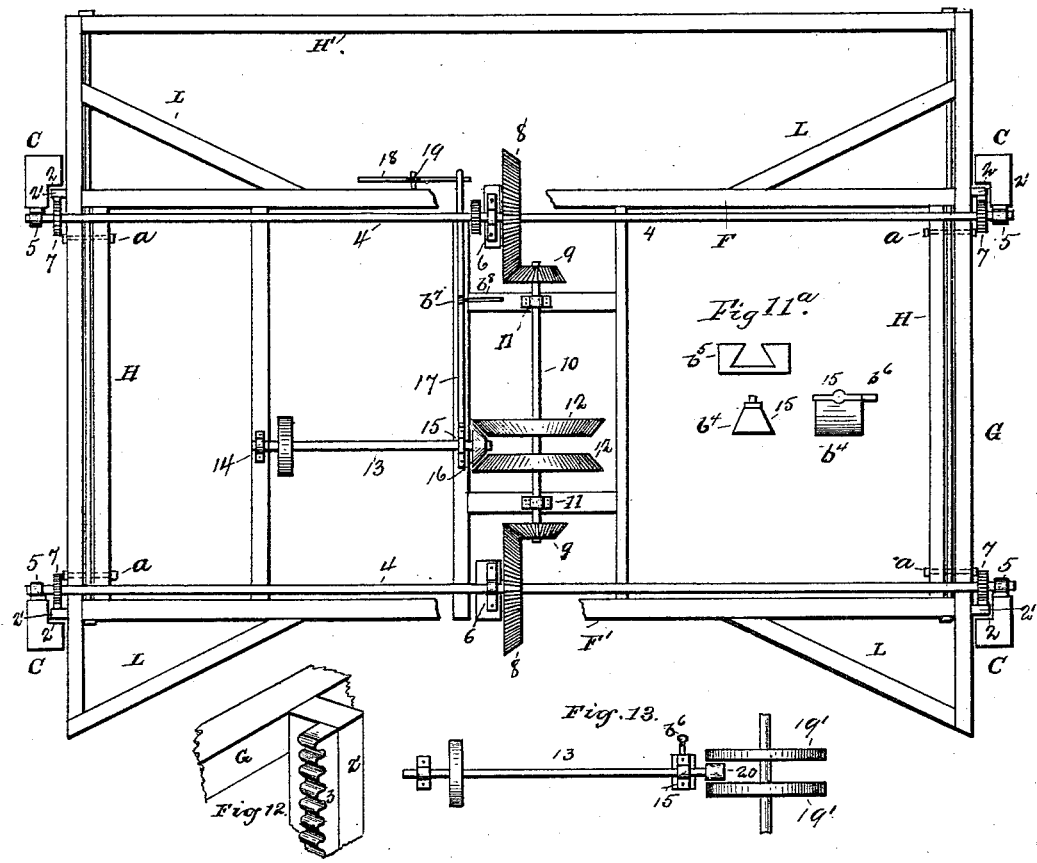

(No Model.) 5 Sheets—Sheet 4.
H. W. CLARK.
LUMBER STACKER.

No. 457,611. Patented Aug. 11, 1891.

Attest.
Victor J. Evans.
A. L. Evans

Inventor.
Henry W Clark
By W. A. Redmond
Atty.

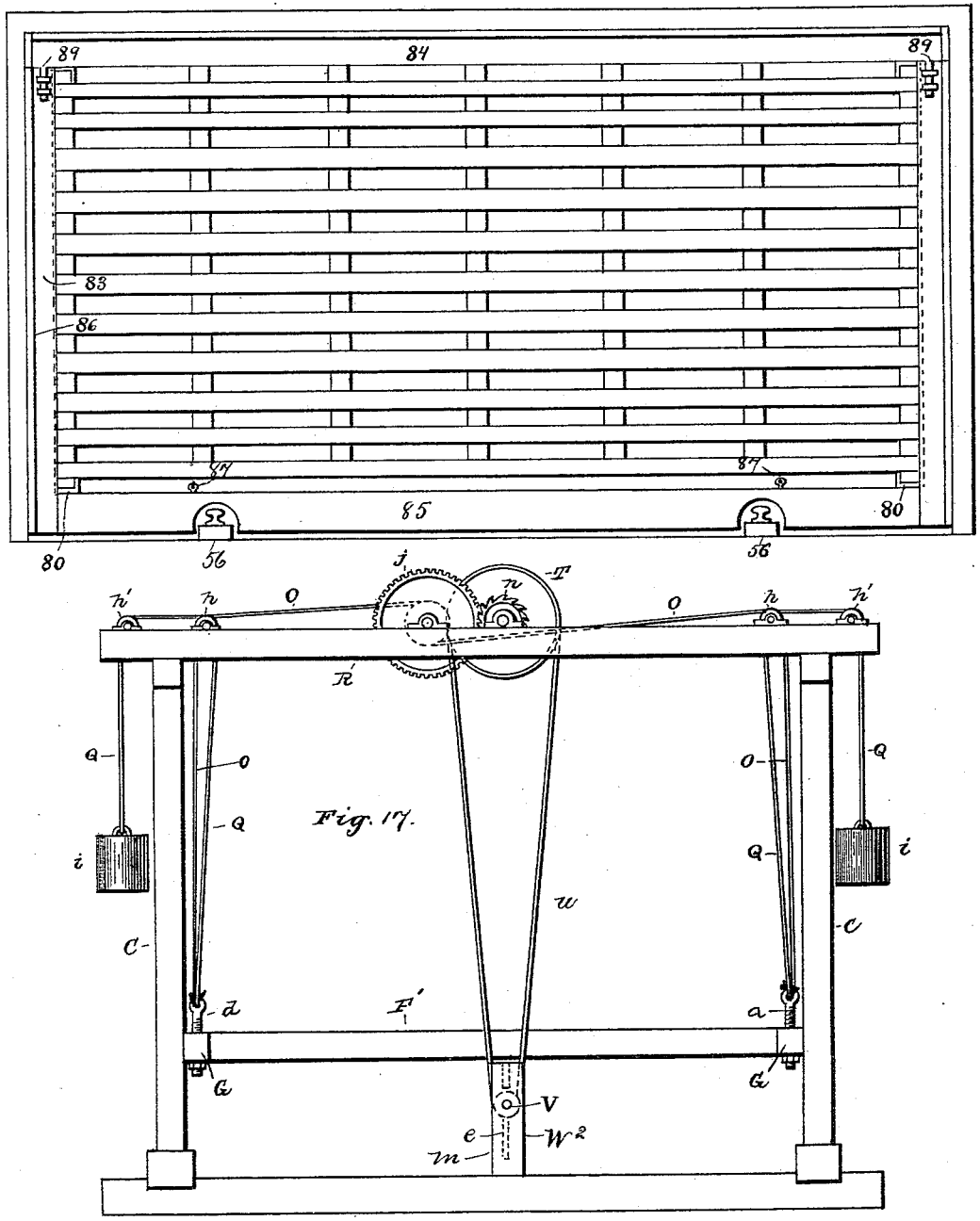

UNITED STATES PATENT OFFICE.

HENRY W. CLARK, OF MONTGOMERY, ALABAMA.

LUMBER-STACKER.

SPECIFICATION forming part of Letters Patent No. 457,611, dated August 11, 1891.

Application filed August 20, 1889. Serial No. 321,420. (No model.)

*To all whom it may concern:*

Be it known that I, HENRY WILLIAM CLARK, a citizen of the United States, residing at Montgomery, in the county of Montgomery and State of Alabama, have invented certain new and useful Improvements in Lumber-Stackers; and I do hereby declare the following to be a full, clear, and exact description of the invention, such as will enable others skilled in the art to which it appertains to make and use the same.

My invention relates to devices for stacking lumber; and it consists in the improved construction and arrangement or combination of parts hereinafter fully disclosed in the description, drawings, and claims.

The objects of my invention are, first, to provide means for guiding the stacking of lumber; second, to provide improved means for guiding the spacing-sticks used between each layer of lumber of the stack; third, to provide improved means for supporting and raising the operator or operators building the stack; fourth, to provide improved means for supporting the spacing-sticks within reach of the operator or operators; fifth, to provide improved means for elevating the lumber into the stacking-guide; sixth, to provide improved means for shoring or guiding the lumber onto the stack, and, seventh, to provide improved means for packing the stacks in the kiln, so as to prevent the hot air from passing around said stacks and to guide the hot air through the same. These objects are attained in the device illustrated in the accompanying drawings, forming part of this specification, in which the same reference letters and numerals indicate the same parts, and in which—

Figure 14:
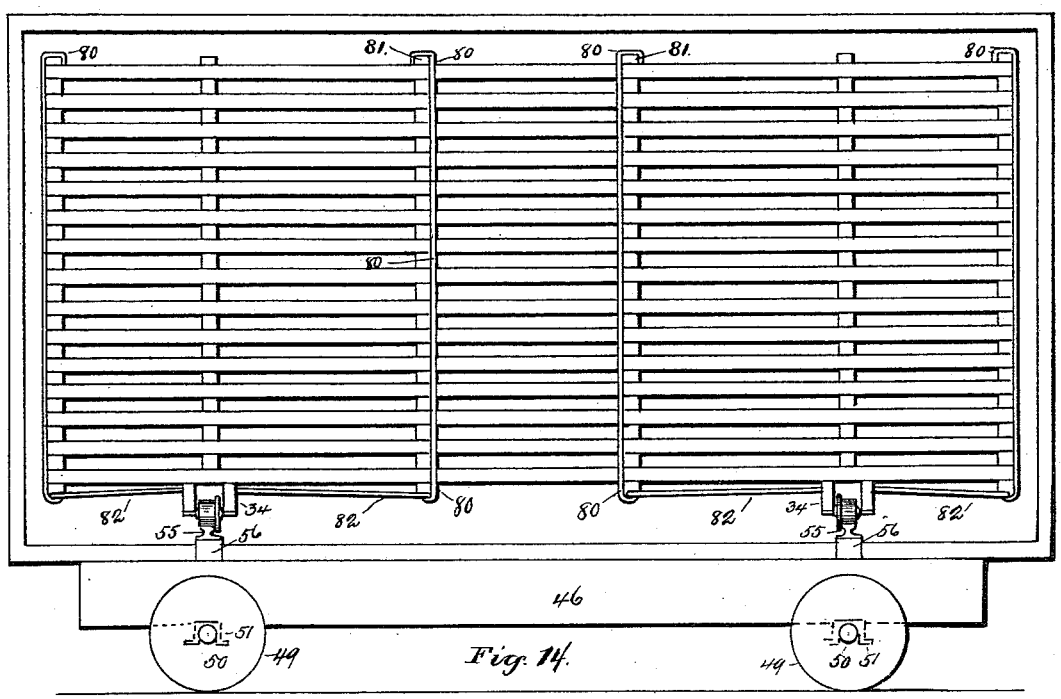
Figure 15:
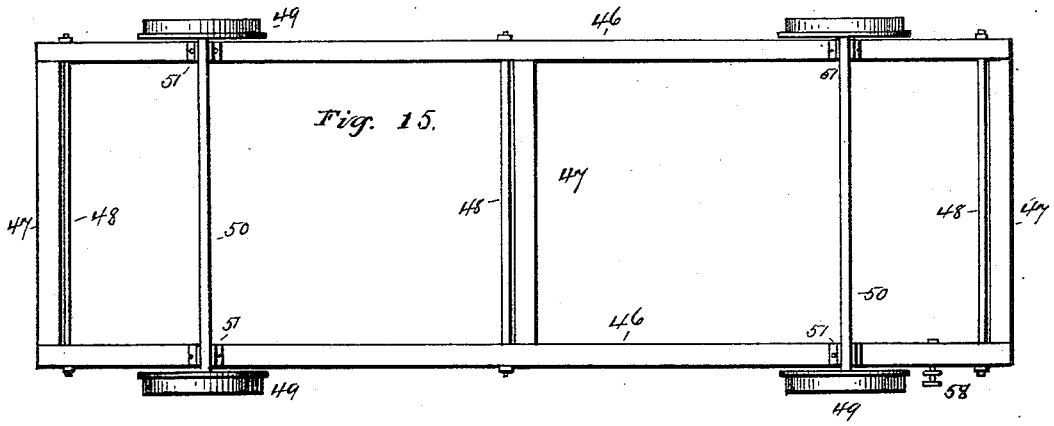

Figure 1 represents an end view of my improved stacking-guide; Fig. 2, a top plan view of the same; Fig. 3, a detail side view of a pawl-and-ratchet device for the hoisting mechanism; Fig. 4, a top plan view of the sliding guide, the guide-posts, and the lumber elevator or conveyer; Fig. 5, a sectional detail view of one arm of said conveyer; Fig. 6, a section of a modified form of said arm; Fig. 7, a side view of the free end of said arm; Fig. 8, a detail view of the conveying-chain; Fig. 9, a view of one of the guides for the conveyer-arms; Fig. 10, a diagram in side elevation of a part of the hoisting mechanism for the guide; Fig. 11, a top plan view of a modified form of hoisting apparatus for the guide; Fig. 11$^a$, detail views of the movable journal-box in said apparatus; Fig. 12, a perspective detail view of one of the guides of the same; Fig. 13, a top plan view of a modified form of friction-driving device for said apparatus; Fig. 14, a side view of a stack of lumber, its truck, and the transfer-car for said truck, showing the stack directly opposite the end of a kiln; Fig. 15, a top plan view of one of the trucks for conveying the trucks and stacks to the kiln; Fig. 16, a view of a stack and truck in the kiln, and Fig. 17 a side view of the stacker-frame and guide.

The frame-work for my improved stacker consists of the base-timbers A, connected at their ends by the cross-timbers B, the uprights C extending from said base-timbers, the upper cross-pieces D, the longitudinal pieces D′, and the inclined brace-bars E, the whole forming a rectangular frame of any desired size, within which the stacking-guide, hereinafter described, works.

The stacking-guide frame consists of the side pieces F F′, extending the full length of said guide, and should be of slightly greater length than the longest lumber to be stacked. These side pieces are connected together at their ends by a cross-piece G of heavier material, which extends beyond the ends of the side pieces a suitable distance for a purpose to be described. On the inner sides or faces of the cross-pieces G are secured by means of bolts *a* or otherwise cross-pieces H, which only extend from one side piece to the other, thus forming a rectangular frame, within which the lumber is stacked. At suitable distances apart, according to the length of the lumber to be stacked, upright strips *b* are secured side by side in pairs to the inner faces of the side pieces F F′ in such a manner as to leave a narrow space between them their entire length. These strips serve several useful purposes, the primary one being to fix the side boundaries of the stack by stopping the lumber, and thus keep the sides of the stack in a true perpendicular line. These strips also facilitate the placing of the spacing-sticks in line, one above the other, and hold them firmly in place when in such position.

At the rear of the frame thus formed a beam H' is secured to the rear ends of the cross-pieces G in any desired manner, and the whole is firmly secured together by rods I, passing from the side piece F across the frame to the beam H'. The purpose of the beam H' is to strengthen the frame and also serves to mount a platform J for the operator to stand on when elevating and lowering the stacking-guide in the operation of the machine. This platform is elevated a suitable distance—say twelve inches—above the stacking-guide, and on each side of the platform I arrange racks, on which the spacing-sticks for the lumber-stack are placed convenient to the operator. At each corner of the stacking-guide frame inclined brace-bars L are secured, which are designed to hold the frame in a true square, and especially to keep the side pieces F F' in a true straight line. This whole frame forms the stacking-guide within which the lumber is stacked, and it travels up and down in the operation of stacking the lumber in sashes formed in the four uprights C of the frame-work, the stacking-guide being at the base of the stack at the beginning, and as the work progresses the stacking-guide is gradually elevated from time to time, so as to keep the side pieces F F' and cross-pieces H in position to control the boundaries of the stack as the same is built up. These sashes may be constructed as hereinafter described—that is, in the form of grooves in the uprights C; but the grooves are not absolutely necessary, as the cross-pieces G, fitting against the inner faces of the uprights C, and the guide-blocks N, (see Fig. 1,) secured thereto, fitting against the sides of the uprights, will guide the stacking-frame in its up-and-down movement.

It sometimes happens that the lumber in being transferred from the trimmer to the stacker becomes shored out of line and is not so delivered as to take its place within the stacking-space. To avoid this I provide a shoring-guide at each end of the stacking-guide at the side on which the lumber approaches the same. This guide consists of the bars M, mounted diagonally across and on the ends of two uprights $d^4$, secured to the bars G H of the frame at such an elevation with reference to the carrying-arms (to be described) as to cause such pieces of lumber as may in the course of delivery to the stacker be thrown out of line to be shored in line again before reaching the ends of the carrying-arms, and be thus delivered within the stacking-space.

To the end pieces G are secured guide-blocks N, which work either against the sides of the posts C, as described, above or in an upright groove or way $c$, formed in the inner faces of the principal posts C of the main frame. Through the end pieces G are passed eyebolts $d$, provided with nuts $e$ on their threaded ends, whereby the slack may be taken up in the cables connecting the stacking-guide frame with the operating mechanism, as hereinafter described, and the same equalized.

O represents the cables, having one end secured to the eyebolts and passing from thence up to and over a sheave-wheel $f$, journaled in bearings on the upper longitudinal pieces D' to drums $g$, mounted on the main shaft P, which is journaled in bearings at a suitable point on the longitudinal pieces D' and extends beyond the same on one side of the machine. The cables Q are also secured at one end to the eyebolts $d$ and pass up therefrom to and over sheave-wheels $h$ $h'$ and carry on their free ends weights $i$, in order to counterbalance in part the weight of the stacking-guide frame. The sheave-wheels $h$ $h'$, as shown, are also journaled in bearings secured to the longitudinal pieces D', the wheels being opposite to wheels $f$ and the wheels $h'$ being to one side, so as to suspend the weights $i$ outside of the main frame-work.

As above stated, the main shaft P extends beyond the longitudinal pieces D' and has its outer end journaled in bearings attached to a longitudinal beam R, the ends of which are secured to the cross-pieces D. Near the end of the shaft P a large gear-wheel $j$ is mounted, which meshes with a small pinion $k$, mounted on a short parallel shaft S, having its bearings on the longitudinal piece D' and beam R. The shaft S carries a large grooved wheel T near its inner end, around which an endless belt U passes, said belt also passing round an idler-pulley V, mounted in a movable frame W, open at its bottom and arranged to slide in the grooves or ways $e'$, formed in the uprights $m$, which are secured to the foundation of the main frame at a suitable point below the shaft S, with the idler-pulley V in line with the grooved wheel T, in order that the belt U may be removed from the pulley V when the frame is raised out of the ways or grooves $e'$, to permit the stack of lumber to be readily run out of the stacking-guide when completed. A ratchet-wheel $n$ is mounted on the shaft S between the pinion $k$ and the beam R, and a lever $o$ is pivoted to the frame-work at $p$, the short end of said lever being controlled by a cord $q$ and the long end by a spring $r$, having one end rigidly secured to the frame-work, and the free end pressing against the long end of the lever, so as to hold it normally in contact with the ratchet-wheel $n$. A bolt or spike projecting from the frame-work above the end of the spring acts as a stop and limits the upward movement of the lever when its free end is raised by the cord $q$. The lever, owing to its engagement normally with the teeth of the ratchet-wheel, prevents the gear-works from revolving backward, and thus prevents the stacking-guide from sliding down, which it would have a tendency to do from its own gravity. In its normal position the lever is in engagement with the ratchet-wheel, preventing the downward movement of the stacking-guide but not hindering the upward movement of the same.

When it is desired to lower the stacking-guide, the lever is raised by means of the cord $q$ and so held, thus releasing the ratchet-wheel, until the stacking-guide is lowered into position again for another stack of lumber, when the cord is released and the lever forced into engagement with the ratchet-wheel by the spring.

The stacking-guide is operated by means of the endless belt U. The operator grasps this cord and by it revolves the grooved wheel T and shaft S with pinion $k$, which in turn revolves the gear-wheel $j$ and shaft P, thus winding or unwinding, as desired, the cables O about the drums $g$, and thus elevating or lowering the stacking-guide.

A' represents the carrying-arms, the free ends of which rest on the front side piece F' of the stacking-guide, said arms having their other ends pivotally secured to a rod B', having its ends suitably secured to beams C', projecting rearwardly from the frame of the trimming-machine. The feed-shaft $D^2$ of the trimming-machine is journaled in the frame at a short distance from and parallel with said rod B' and carries two sprocket-wheels E' in line with the arms A'. By mounting the arms A' on the rod B' they are independently supported and their weight entirely removed from the feed-shaft, said shaft being driven by belting from the saw-mandrel, which is journaled at a suitable point on the frame. The arms A' are formed with a groove $a'$ in their upper surfaces, in which the sprocket-chains $b'$, having carrying-lugs $c'$, formed thereon or secured thereto, run, said chains moving or carrying the lumber from the trimming-machine to the stacker. The arms A' are made of wood for the sake of lightness, and the upper surface thereof is stripped with metal $d'$ alongside of the groove on both sides for the lumber to rest and move on.

A modification of the arms is shown in Fig. 6, in which the grooves are formed by metallic plates or strips $e^2$, which are secured to the arm on each side and project above the upper surface of the same, thus forming the groove between them. To the free ends of the arms A', I secure at each side perforated metal plates $f'$ by means of removable bolts, so that said plates may be moved along the sides of the arms when it is desired to take up the slack of the chains $b'$, which pass over the pulleys $g'$, journaled between the ends of said plates. At the under side of each of said arms I secure one end of a flat spring $h^2$, in the free end of which a pulley $i'$ is journaled, which works against the inner sides of the chains $b'$, in order to tighten said chains. By means of this spring and pulley and the movable plates $f'$ the proper tension is applied to the chains and the same kept taut. The chains pass round the sprocket-wheels E', and are thus driven from the feed-shaft of the trimming-machine on which said wheels are mounted.

The arms A' move up and down with the stacking-guide, turning on the rod B', as on a pivot, its point of contact with the side piece F' of course changing as the stacking-guide moves up and down. In order to render this movement of the arms easy, I secure to the outer side of said side piece the movable or adjustable brackets $k'$, (see Fig. 9,) in the upper ends of which I journal friction-pulleys $l'$, on which the free ends of the arms A' rest and work, the under surface of said ends being covered with any desired sheet-metal strips $m'$ at the point of contact between the arms and pulleys, as shown in Fig. 5. These brackets and pulleys are not absolutely necessary to the operation of the machine; but as they tend to reduce friction and wear of the parts I prefer to use them.

The elevation of the free ends of the arms A' may be varied, as desired, by means of the brackets $k'$, which may be adjusted up or down, as desired. If it is intended that the operator receive and place the lumber by hand on the stack, the arms must be elevated so as to deliver it convenient to him. If it be intended to place it otherwise than by hand, as hereinafter described, the elevation of the arms should correspond to the elevation of the platform J on which the operator stands in working the machine.

All the parts may be varied as to dimensions as the requirements of the work demand. The arms A' may be worked at any desired angle to the upper surface of the trimming-machine; but a central position is most desirable—that is, the center in height of the completed stack should be on a plane or level with the upper surface of the trimming-machine. The chains $b'$ take the lumber from the trimming-machine and carry it along the arms A' and deliver it over the ends of said arms to the operator, or discharge it on the spacing-sticks within the stacking-space, as may be preferred. The latter is the usual course pursued, and the operators, frequently two boys, with suitable rods in hand move the lumber first to one side and then to the other against the strips $b$ on the side pieces F F' of the stacking-guide until a tier is built up or completed, leaving any surplus space at the middle of the stack. When a tier is completed, the spacing-sticks are placed in position between the strips $b$ and on the top of the tier and another tier laid thereon, continuing thus till the stack is completed.

In Fig. 11 I show a modification of the device for elevating and lowering the stacking-guide, and such slight modifications of the latter as the changes in the operating mechanism render necessary or desirable, particularly adapted for the use of steam-power instead of hand-power, as employed in the device above described.

C represents the uprights of the main frame of the stacker, only four of which are required in this construction and arrangement of the parts. On the inner faces of these uprights vertical recesses 2 are formed, in which work beams 2', having rack-arms 3 secured thereto, said beams being rigidly attached at their upper ends to the end pieces G of the stacking-guide. At each side of the main frame a shaft 4 is mounted, which is journaled in bearings 5, secured to the sides of the uprights C at each end, and also supported by bearings 6 at the center, secured to a suitable upright let into the main frame. Small pinions 7 are mounted on said shafts at their ends, which mesh with or engage the teeth of the rack-arms 3 and move said arms up or down in the recesses 2, according to the direction in which said pinions are rotated, and thus move the stacking-guide to which the arms are secured. Near the centers of the shafts 4 are mounted the bevel gear-wheels 8, which mesh with bevel-pinions 9, mounted at the ends of a shaft 10, having its bearings in suitable boxes 11, secured to a bar on the main frame. Near one end of said shaft 10 two beveled friction-wheels 12, preferably of iron, are mounted at a short distance apart with their beveled edges contiguous to each other. A short shaft 13, having its bearing at one end in a box 14, adapted to permit a slight lateral movement of said shaft, and its other end in a movable journal-box 15, is arranged at right angles to the shaft 10 and carries at its movable end the beveled friction-wheel 16, preferably of paper, which fits between the wheels 12, and is adapted to be moved against either of them by the lever 17, having one end connected to the movable box 15 and its other end having an eye therein, through which one end of a hand-lever 18 passes, said lever being pivotally mounted at 19 near the foundation of the main frame and its free end extending upwardly within easy reach of the operator. Thus the operator may cause the stacking-guide to move up or down at will by simply moving the friction-pinion 16 against one or the other of the friction-wheels 12, thus causing the shaft 10 to rotate and with it the bevel-pinions 9 and bevel-wheels 8, the latter rotating shafts 4 and pinions 7, which are in mesh with the rack-arms.

The journal-box 15, as shown in detail in Fig. 11$^a$, consists of the base-piece $b^5$, having a dovetail groove formed therein adapted to receive the sliding box $b^4$, which is formed dovetail to correspond to the groove, and on this latter is the babbitt-lined journal-seat, having the usual cap bolted on. A lug $b^6$, having an eye, is formed on the sliding box at one end in order to receive the end of the lever, which is moved back and forth to slide said box by means of the hand-lever 18 to bring the friction-pinion 16 against the friction-wheels 12 to move the stacking-guide up or down. The lever 17 is guided and supported in its movement by passing through a perforation in a bar secured to the main frame, and its outer end is easily detachable from lever 18, in order to remove the same when it is desired to move a complete stack out of the stacker. A spring $b^8$ is secured at one end to the main frame and has its free end resting in an eye $b^7$, secured to the lever 17, and so set or adapted to hold the lever in a position which will prevent the friction-pinion 16 from coming in contact with the wheels 12, except when the lever is operated to cause it to engage them.

As shown in Fig. 13, I may use two plain or unbeveled friction-wheels 19' and an unbeveled friction-pinion 20, mounted on a movable or adjustable shaft, as in the arrangement above described, adapted to be thrown into contact with either of the wheels 19', in order to reverse the direction in which they rotate, and thus raise or lower the stacking-guide, as above described. As shown in the drawings of both devices, the pinions and gear-wheels are of such different diameters as will impart a slow movement to the stacking-guide, as it is not desired that it move at a rapid rate of speed. The use of friction as the direct power for the operation of the device enables the operator to apply just such force as is necessary to move the parts at a gentle uniform speed, thus compensating in part for the want of sufficient gearing down of speed.

I employ a truck adapted to enter beneath the frame of the stacker to receive the lumber which is stacked thereon ready to be conveyed to the kiln to be cured and dried. The truck forms the foundation for the first tier of lumber forming the stack, and as the first tier will necessarily be level and straight, owing to the fact that the truck is perfectly flat or level on top, all other tiers will be level and straight, thus obviating any tendency which the stack would have if laid on an uneven foundation to slip or slide off its base while being moved from the stacker to the kiln or from the kiln to the place of storage.

When in use, the trucks are placed within the main frame of the stacker on tracks and the lumber stacked thereon, as described. The tracks are formed of ordinary T-rails of the desired weight laid on an incline toward a track crossing at right angles and leading to the kilns on which the transfer-cars, to be described, run, and when the lumber is removed from said trucks they are taken apart and carried back to the stacker and put together.

The transfer-cars, one of which is shown in Fig. 14, having a loaded portable truck thereon, and in bottom plan view, Fig. 15, consist of the side beams 46 and cross-beams 47, rigidly secured together by tie-rods 48 to form a rectangular frame. The flanged car-wheels 49 are mounted outside the frame on axles 50, having their bearings in open-bottomed journal-boxes 51, secured to the under side or edge of the beams 46 by lag-screws. As these car-wheels have no tendency to move out of place, nothing is required to secure their axles to the frame or in their boxes.

The rails 55 for the portable trucks are secured to the upper surface of the transverse bars 56, securely mounted on the beams 46 immediately over the wheels 49. I mount the wheels 49 outside the beams 46, for the reason that there is less liability of the car tilting up or tipping over when the loaded trucks are being moved on and off the same, owing to the bearings being inside the wheels.

In Fig. 14 I show a truck loaded with a stack of lumber and mounted on the transfer-car and illustrating my means for securing the lumber in place on the truck. A series of upright bars or rods 80, having their upper and lower ends bent at right angles, are suspended from the ends of cross-pieces 81, which are laid on the top of the completed stack in line with the spacing-sticks. At their lower ends these rods are hooked into the bent ends of springs 82, which are suitably secured at one end to the longitudinal beams or connecting-pieces 34 of the trucks. Both sides of the stack are provided with the rods and springs, and thus the top layer or tier of the stack is held down securely and prevented from warping when undergoing the drying process in the kilns, and the entire stack is held in true line as first laid. To the outer uprights or those next the ends of the stack I secure an apron 83, having a flexible border 86, and a like apron 84 is secured at the top of the stack. These aprons are arranged so as to come into contact with the sides and ceiling of the kiln. Another apron 85, having a portion of its lower part cut away to fit about the beams 56 of the transfer-car, is attached to hooks on the connecting-beams 34 by means of loops or eyes 87 and extends nearly to the floor. This last-named apron, not coming in contact with the floor, does not require a flexible border.

The side aprons are secured in any desired manner to the uprights and are provided with staples or eyes 88, through which the slats 89 of the apron 84 are passed in order to secure said apron 84 in place. Thus it will be seen that I so jacket the entire stack as to prevent any air-currents reaching the lumber, and thus secure the full benefit of the heating capacity of the kilns.

Another important advantage of the end aprons is the exclusion of the hot air from the ends of the lumber—that is, from the outer tiers of spacing-sticks to the ends of the lumber—and this greatly prevents, especially in drying boards, the checking and splitting of the ends, which has heretofore been so fruitful a cause of damage and complaint.

I use a square—perfectly square—spacing-stick, which enables me to lay them just as they come to hand, which cannot be done with the sticks in ordinary use, as they are usually made with only two sides true.

Having thus fully described the construction and arrangement or combination of the several parts of my improved device for stacking lumber and conveying it to the kiln, what I claim as new, and desire to secure by Letters Patent, is—

1. In a lumber-stacker, the combination, with the main frame having the vertical guides C, of the stacking-guide having the ends of its sides G extending beyond said guides C and provided with the oblique braces L for said extended ends, substantially as described.

2. In a lumber-stacker, the combination, with the main frame having the vertical guideways, the stacking-guide frame adapted to slide in said guideways, and mechanism for elevating and lowering said guide-frame arranged at the top of said main frame, of the device for operating said mechanism, which consists of the grooved wheel T, journaled in the top of said main frame, the upright guide-frame $e'$ and $m$, open at its upper end, the frame W, sliding in said guide-frame, the idler-pulley V, journaled in said sliding frame, and the belt U, passing around said wheel and pulley V, substantially as described.

3. The combination, in a lumber-stacker, with a vertically-sliding stacking-guide frame, of the carrying device hinged at one end and having its other end resting freely on one edge of said guide-frame, and the endless chains traveling upon said arms and provided at intervals with carrying-lugs having inclined rear faces and vertical forward faces, substantially as described.

4. The combination, in a lumber-stacker, of the main frame, the stacking-guide frame having a platform and adapted to slide vertically within said main frame, the shaft P, mounted on the main frame, the drums mounted on said shaft, the hoisting or elevating cables having one end connected to the stacking-guide frame and the other to the drums, the weight-cables having one end connected to the stacking-guide frame and the other carrying counter-weights, guide pulleys or sheaves for said cables mounted in the main frame, the gear-wheel mounted on said shaft, the counter-shaft, the pinion mounted thereon, the grooved wheel, and the endless belt for operating said grooved wheel, substantially as described.

5. The combination of the main frame having the uprights C and the beams D' and R, the stacking-guide frame having the platform J and adapted to slide between said uprights, the guide pulleys or sheaves $f$ and $h$ $h'$, mounted in the corners of the main frame, the shaft P, the drums $g$, mounted on said shaft, the hoisting-cables O, having one end connected to the stacking-guide frame, the weight-cables Q, having one end connected to the stacking-guide frame and carrying the counter-weights $i$, the counter-shaft S, the pulley T, mounted on said counter-shaft, gearing connecting said shafts, and the endless rope or belt U, passing around said pulley and within reach of said platform J, substantially as described.

6. The combination, with the frame of a truck, of flat springs projecting laterally from said frame, top cross-pieces 81, and bars or rods having hook ends adapted to engage the ends of said springs and said cross-pieces, substantially as described.

7. The combination, with a loaded lumber-truck, of upright bars at the ends of the same, aprons having flexible edges secured to said bars and provided with eyes at their upper ends, aprons having flexible edges and secured along the top edges of ends of the load by slats fitted in said eyes, and aprons hung at the lower edges of the sides of the load, substantially as described.

8. The combination, in a lumber-stacker with a vertically-sliding stacking-guide frame, of the pivoted carrying-arms having grooves in their upper faces and pulleys at their free ends and resting upon said guide-frame, endless sprocket-chains traveling over said pulleys and within said grooves and provided with carrying-lugs at intervals, and means for driving said chains, substantially as described.

9. In a lumber-stacker, the combination, with a vertically-sliding stacking-guide frame, of the carrying-arms pivotally mounted at one end on the trimmer-frame and having their free ends resting upon said guide-frame, the metallic strips secured to the sides thereof, guide-pulleys in the outer ends of said arms, a shaft mounted on the trimmer-frame, sprocket-wheels mounted on said shaft, endless chains provided at intervals with carrying-lugs and traveling around said pulleys and sprocket-wheels, and springs secured upon the under sides of said arms and having pulleys in their ends which bear against and take up the slack of said chains, substantially as described.

10. In a lumber-stacker, the combination, with a vertically-sliding stacking-guide frame, of the carrying-arms $A'$, having the grooves $a'$ and metallic facing-strips and pivoted at their inner ends, the guide-pulleys $g'$, secured longitudinally and adjustably upon the outer ends of said arms, the feed-shaft $D^2$, journaled at the inner ends of said arms and having the sprocket-wheels $E'$, the springs $h^2$, secured upon the arms and carrying the pulleys $i'$, and the sprocket-chains having the carrying-lugs $c'$, substantially as described.

11. In a lumber-stacker, the combination, with a vertically-sliding stacking-guide frame and carrying-arms pivoted at their inner ends and resting upon said frame, of brackets $k$ upon said frame and friction-pulleys in said brackets supporting said arms, substantially as described.

12. In a lumber-stacker, the combination, with a vertically-sliding stacking-guide frame and carrying-arms resting upon one side of said frame, of shoring-guides consisting of two oblique bars mounted upon the end pieces of said frame, substantially as described.

In testimony whereof I affix my signature in presence of two witnesses.

HENRY W. CLARK.

Witnesses:
R. C. FARISS, Jr.,
H. C. DAVIDSON.